United States Patent

[11] 3,588,797

| [72] | Inventors | Gunter Hans Ziehm<br>Kiel;<br>Karl-Friedrich Triebold, Bremen-Osterholz, Germany |
|---|---|---|
| [21] | Appl. No. | 841,096 |
| [22] | Filed | July 11, 1969 |
| [45] | Patented | June 28, 1971 |
| [73] | Assignee | Fried. Krupp Gesellschaft mit beschrankter Haftung<br>Essen, Germany |
| [32] | Priority | July 12, 1968 |
| [33] | | Germany |
| [31] | | P 17 66 754.8 |

[54] APPARATUS FOR COMPENSATING HARMONIC-DEPENDENT COMPONENTS IN A DIRECTION-SENSITIVE ACOUSTIC TRANSDUCER SYSTEM
4 Claims, 2 Drawing Figs.

[52] U.S. Cl................................................. 340/6, 340/16
[51] Int. Cl..................................................... G01s 3/00
[50] Field of Search............................................. 340/6, 16

[56] References Cited
UNITED STATES PATENTS
3,286,224  11/1966  Zefting .................... 340/6

Primary Examiner—Richard A. Farley
Attorney—Spencer and Kaye

ABSTRACT: Apparatus for compensating the harmonic-dependent components of the difference voltages produced by a direction-sensitive sound pressure gradient transducer system. The transducer elements of the transducer system are distributed around the circumference of a circle and the difference voltages derived from the pairs of elements lying on opposite sides of the circle. According to the invention, an additional transducer system, identical to the first, is provided with its transducer elements arranged in the same circle but displaced by an angle $\pi k+1$, where $k$ equals 1, 2, .... The transducer elements of the additional transducer system are connected together with the corresponding elements of the original transducer system so that their output signals are added.

Patented June 28, 1971

Inventors:
Günter Hans Ziehm
Karl-Friedrich Triebold
By: Spencer & Kaye
   Attorneys

APPARATUS FOR COMPENSATING HARMONIC-DEPENDENT COMPONENTS IN A DIRECTION-SENSITIVE ACOUSTIC TRANSDUCER SYSTEM

CROSS-REFERENCE TO RELATED APPLICATION

The subject matter of this application is related to that disclosed in the copending application Ser. No. 701,772, filed Jan. 30th, 1968, of Gunter Ziehm, Karl-Friedrich Triebold, Alfred Schief and Reinhard Wilhelm Leisterer, now U.S. Pat. No. 3,464,056, issued Aug. 26, 1969.

BACKGROUND OF THE INVENTION

The present invention relates to apparatus for compensating harmonic-dependent components of the difference voltages which are produced in a direction-sensitive acoustic pressure gradient transducer system of the type having a plurality of transducer elements arranged in a circle. In such a transducer system, which is shown and described in the copending application referred to above, the difference voltages, which are proportional to the differences of the output signals of respective pairs of transducer elements that lie on opposite sides of the circle, may be used to provide an indication of the angle of incidence of acoustic plane waves.

Sound pressure gradient transducer systems of this general type are well known in the art. They may be used to provide a display of the angle of incidence, in a given plane, of acoustic plane waves which impinge on the transducer elements. This is accomplished by producing two direction-dependent voltages, having amplitudes of sine and cosine dependence, respectively, upon the angle of incidence of the sound and producing a nondirection-dependent voltage, or voltage with an amplitude independent of the angle of incidence, as the sound is received. These voltages are employed, for example, to display the direction on the screen of a cathode-ray tube. The direction-dependent voltages with the sine and cosine dependence are applied to the deflection systems of the cathode-ray tube while the nondirection-dependent voltage is employed to remove the ambiguity in the direction displayed; that is, to inhibit the display of the angle which is 180° away from the angle of incidence.

This type of sound pressure gradient transducer system operates satisfactorily so long as the spacing between the transducer elements is smaller than the wavelength $\lambda = c/f_{max}$, where $c$ is the speed of the sound in the medium in which it travels and $f_{max}$ the highest frequency of the frequency range within which the system operates.

If, however, the wavelength $\lambda$ is comparable to the mutual spacing between the transducer elements, the direction display becomes frequency dependent. Systematic display errors (system errors) will be present since it will no longer be possible to ignore the distorting components of the direction-dependent and independent voltages. By a mathematical survey-—using Bessel-Functions—it can be shown, that the bearing voltages get a distorting part which is running with odd multiples of the azimuth angle and no longer can be neglected while the direction-independent voltage is running with even multiples of the azimuth angles. Now this distorting behavior of the voltages is related to the azimuth angle and we call the distorting parts the spatial harmonics or just the harmonics of the incident sound.

SUMMARY OF THE INVENTION

An object of the present invention, therefore, is to provide apparatus for reducing the system errors in the acoustic pressure gradient transducer system of the type described above.

This object, as well as other objects which will become apparent in the discussion that follows, is achieved, according to the present invention, by providing an additional transducer system with a like number of identically arranged transducer elements angularly displaced with respect to corresponding ones of the transducer elements of the original system by $\pi/3$ or $\pi/5$ or, in general, $\pi/2k+1$. These displaced transducer elements are then connected together with their corresponding original transducer elements so as to provide an addition of voltage or current.

Although the above-described apparatus according to the present invention is effective to reduce the system errors caused by the strongest harmonics, the simultaneous compensation of all the system errors due to harmonics requires the addition of a plurality of angularly displaced transducer systems. In this case, the first system should be displaced by $\pi/3$, the second by $\pi/6+\pi/5$ and each successive system displaced by an additional angle of $\pi/2k+1$ with respect to the directional axis of the entire transducer system formed by the preceding transducer systems.

DESCRIPTION OF THE PREFERRED EMBODIMENTS

Figure 1:
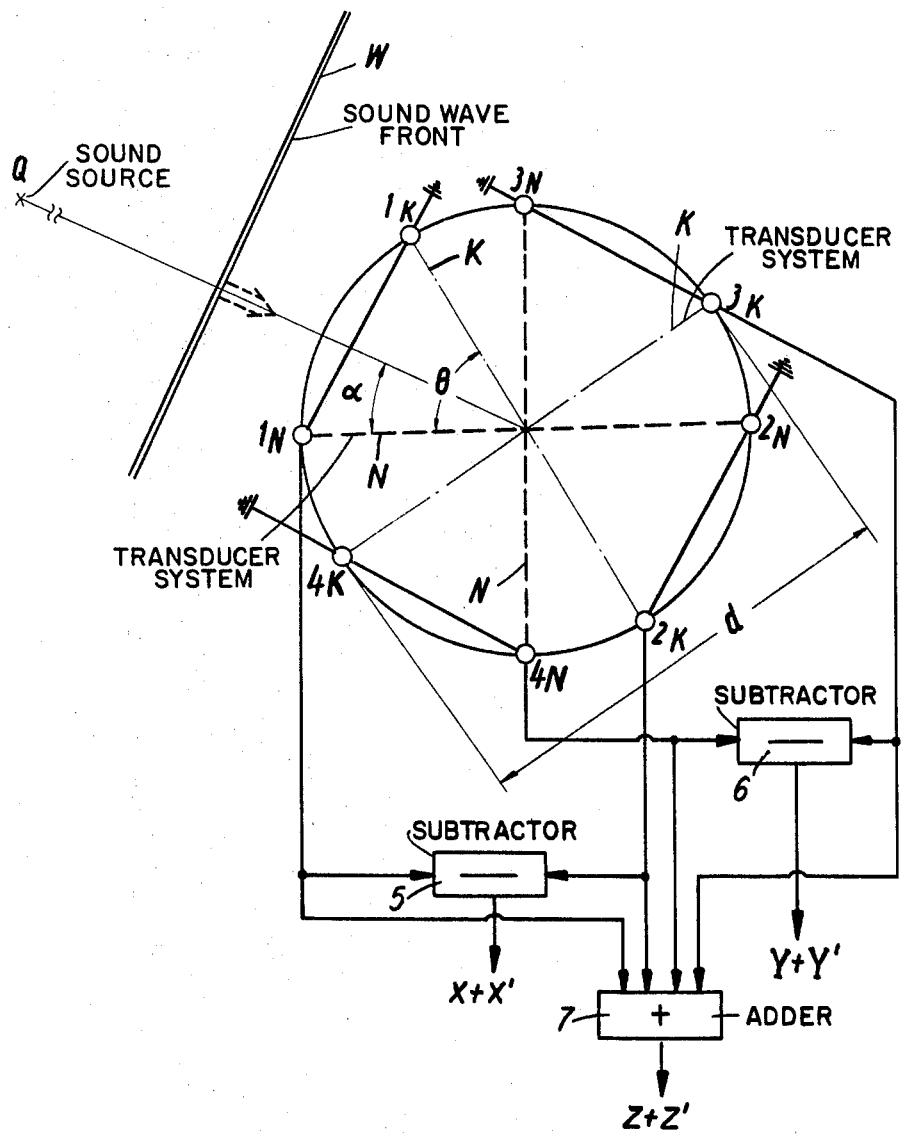
FIG. 1 is a schematic diagram of one preferred embodiment of apparatus according to the present invention for compensating the harmonic-dependent distorting components of the difference voltage outputs of a direction-sensitive transducer system.

The preferred embodiments of the present invention will now be described in connection with FIGS. 1 and 2 of the drawing. FIG. 1 of the drawing schematically illustrates one preferred embodiment of the present invention having two transducer systems N and K displaced with respect to each other by an angle $\Theta$. Each of the transducer systems comprises four transducer elements $1_N$, $2_N$, $3_N$, $4_N$ and $1_K$, $2_K$, $3_K$, $4_K$, respectively, arranged in a circle. Both transducer systems lie in the plane in which the direction determination is to take place.

The acoustic signals at a frequency $\omega/2\pi$ are sent by a source Q which is so distant from the transducer systems that the sound wave front W at the point of receipt is effectively planar. Upon receipt of these sound signals the transducer system N produces the direction-dependent voltages X and Y from the difference characteristics of pairs of transducer elements as well as the direction-independent voltage Z as the sum of the output signals of all the transducer elements $1_N$, $2_N$, $3_N$, $4_N$. The voltages X and Y are given by:

$X = A_0 \sin(\pi d/\lambda) \cos\alpha \cdot \cos\omega t$ and
$Y = A_0 \sin(\pi d/\lambda) \sin\alpha \cdot \cos\omega t$ As is well known, the sine function can be expanded in a series containing only odd terms. The expansion yields:

$X = (A_1\cos\alpha + A_3\cos3\alpha + A_5\cos5\alpha \cdots + A_n\cos n\alpha + \ldots) \cos\omega t$
$Y = (A_1\sin\alpha + A_3\sin3\alpha + A_5\sin5\alpha \cdots + A_n\sin n\alpha + \ldots) \cos\omega t$
$Z = (B_0{}^B{}_2 \cos 2\alpha + B_4\cos4\alpha + \ldots + B_{n11}\cos(n-1)\alpha + \ldots) \sin\omega t$ Here the angle $\alpha$ is the angle of incidence of the wave front with respect to the fixed axis of the transducer system N; $A_N$ is the amplitude of the nth ($n=1, 2, 3, \ldots$) harmonic of the direction-dependent voltages and $B_{n11}$ is the amplitude of the $(n-1)$th harmonic of the direction-independent voltage.

Distorting components of the direction-dependent voltages X and Y of the transducer system N are eliminated by adding the direction-dependent voltages X' and Y' of the transducer system K:

$X' = (A_1\cos(\alpha-\Theta) + A_3\cos3(\alpha-\Theta) + A_5\cos5(\alpha-\cdot + \ldots + A_n\cos n(\alpha-ahK) + \ldots)\cos\omega t$
$Y' = (A_1\sin(60 -\Theta) + A_3\sin3(\alpha-\Theta) + A_5\sin5(\alpha-\Theta) + \ldots + A_n\sin n(\alpha-ahK) + \ldots)\cos\omega t$ where $\Theta$ is the angle of displacement between the transducer system K and the transducer system N.

The addition of the direction-dependent voltages X' and Y' of the system K with the direction-dependent voltages X and Y of the system N may be effected by connecting the corresponding transducer elements of the two systems in series as shown in FIG. 1. The voltages X+X' and Y+Y' are then fed to the known subtractor elements 5 and 6, respectively, where they are made direction-dependent from their difference characteristics. The voltages X+X' and Y+Y' are also fed to the known adder element 7 to produce the direction-independent voltage Z+Z'.

The sum of the direction-dependent voltages X+X' is given by:

$$X+X'=2\left(A_1\left(\cos\left(\alpha-\frac{\theta}{2}\right)\cos\frac{\theta}{2}\right)\right.$$
$$+A_3\left(\cos 3\left(\alpha-\frac{3\theta}{2}\right)\cos\frac{3\theta}{2}\right)$$
$$+A_5\left(\cos 5\left(\alpha-\frac{\theta}{2}\right)\cos\frac{5\theta}{2}\right)+A_n\left(\cos n\right.$$
$$\left.\left.\left(\alpha-\frac{\theta}{2}\right)\cos\frac{n\theta}{2}\right)+\ldots\right)\cos\omega t$$

A harmonic of the $n$th order will disappear if $\cos n\theta/2=0$. This is the case when $\theta$ is set equal to $m\pi/n$, where $m$ and $n$ are whole numbers. If, for example, the harmonic of the third order ($n=3$) is to equal zero, $\theta$ should be chosen to equal $\pi/3$. If this is done, the harmonics with $n=9, 15, 21$, etc. will also disappear because the factor $m$ can assume the values $m=1, 3, 5, 7, 9$, etc. With an angular displacement of $\theta=\pi/3$, therefore, all the harmonics for which the relationship $n=3m$ holds true will disappear. The new direction-dependent voltage X+X' will thus be compensated for these harmonics.

The identical considerations apply to the direction-dependent voltages Y and Y'.

The compensated direction-dependent voltages will have their reference axis at $\theta/2=\pi/6$ (the central axis between the reference axes of the transducer system N and the transducer system K) when the latter system is angularly displaced by the angle $\pi/3$.

Instead of the addition of voltages effected by the series connection of the transducer elements, it is also possible to provide for an addition of currents by a parallel connection of the transducer elements. Such an arrangement is shown schematically in FIG. 2. The subtractor elements 5' and 6', and the adder element 7' FIG. 2 are equivalent to elements 5—7, respectively, of FIG. 1.

The transducer elements employed in the transducer systems of the present invention can be omnidirectional receivers of conventional design; that is, microphones for use in air or hydrophones for receiving sound waves in water. Such transducer elements should be small compared to the wavelength of the highest frequency of sound in the operative frequency range. The sound pressure gradient transducer system can be made considerably more compact if constructed as a magnetostrictive or electrostrictive hollow cylinder with corresponding windings or plates of suitable density. Such a transducer system is shown and described in the copending application Ser. No. 777,806, filed Nov. 21, 1968, of Gunter Hans Ziehm, Karl-Friedrich Triebold and Siegfried Franz Heinrich Drischel, now Pat. No. 3,496,527 issued Feb. 17, 1970

Figure 2:
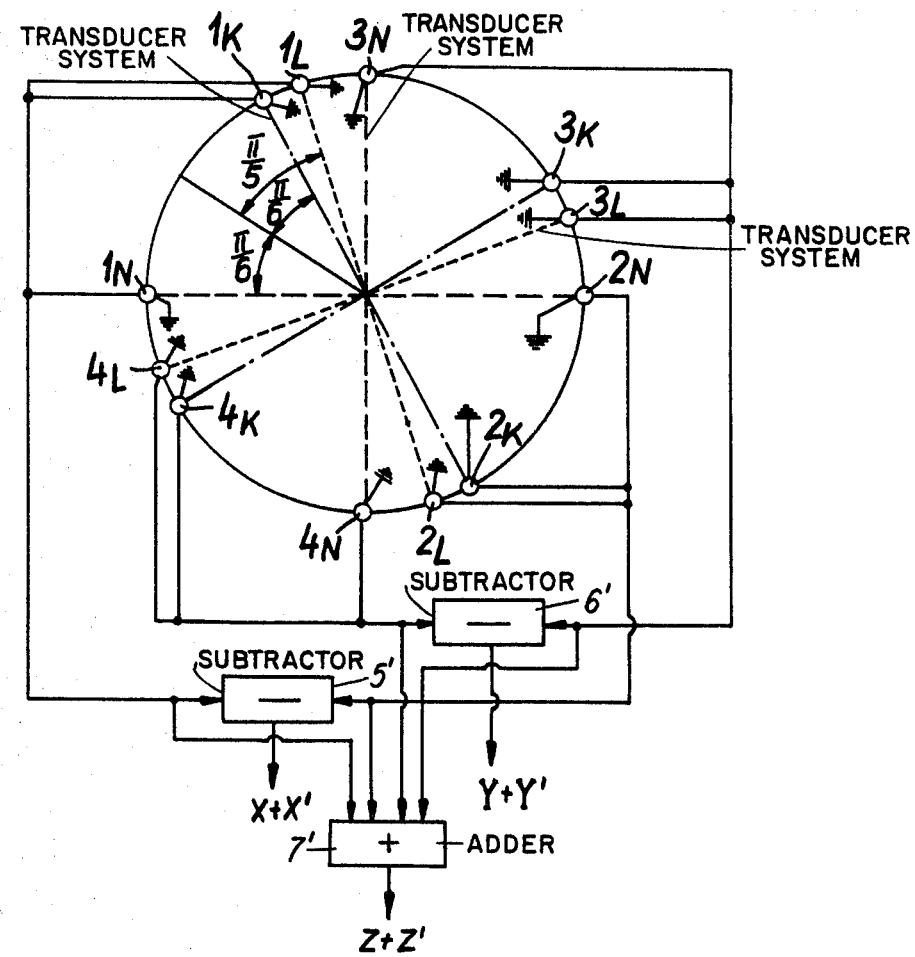
FIG. 2 is a schematic diagram of a second preferred embodiment of apparatus according to the present invention for compensating the harmonic-dependent interfering components of the difference voltage outputs of a direction-sensitive transducer system.

FIG. 2 illustrates another preferred embodiment of the apparatus according to the present invention. This embodiment illustrates how two or more additional transducer systems K, L, ... may be used to compensate as many harmonics as desired.

In addition to the harmonics $n=3m$ compensated by the transducer system K at $\theta=\pi/3$, it is also possible to compensate the harmonics $n=5m, 7m$, or, in general, $n=(2k+1)m$ by providing further transducer systems displaced by an angle $\theta=\pi 5\cdot\pi/7$ or, in general, $\theta=\pi/2k+1$. As in the case of the embodiment of FIG. 1, the voltages or, as in FIG. 2, the currents of these angularly displaced transducer systems are added to form new direction-dependent voltages. The displacement by the angle $\pi/5$, for example, must be taken with respect to the previously compensated reference axis; that is, the axis which lies at an angle $\pi/6$ from the original reference axis of the uncompensated transducer system N.

As is shown by the series expansion of the sine series, the higher harmonics fall off quickly so that, in practice, the compensation can be generally limited to the third or, if necessary, to the fifth terms. This technique of adding additional transducer systems, as is illustrated in FIG. 2, may be employed, however, to provide compensation to any desired degree of accuracy.

The apparatus according to the present invention for rendering a direction-sensitive transducer system independent of sound frequency is not limited to systems operating only in a single plane. A frequency-independent three-dimensional direction determination can be effected by providing two harmonic-compensated transducer systems on mutually perpendicular planes.

It will be understood that the above description of the present invention is susceptible to various modifications, changes and adaptations.

We claim:

1. In an acoustic pressure gradient transducer system having a plurality of first transducer elements arranged in a circle and a plurality of difference forming means, each connected to two of said first transducer elements which are on opposite sides of said circle, for producing a voltage proportional to the difference of the output signals of said two opposite first transducer elements, the improvement comprising apparatus for compensating the harmonic-dependent distorting components of the difference voltage outputs of said transducer system, said apparatus comprising:
   a. an additional transducer system having a like number of second transducer elements each arranged in said circle and angularly displaced with respect to corresponding ones of said first transducer elements by $\pi/2k+1$, where $k$ equals 1, 2, ...; and
   b. means, connected to receive the output signals of corresponding ones of said first and second transducer elements, and connected to said difference forming means, for producing corresponding signals proportional to the sum of said output signals.

2. The improvement defined in claim 1, wherein said signal producing means form the sum of output currents.

3. The improvement defined in claim 1, wherein said signal producing means form the sum of output voltages.

4. The improvement defined in claim 1, wherein there is a plurality of additional transducer systems having a like number of second transducer elements, each arranged in said circle and angularly displaced with respect to corresponding ones of said first transducer elements by $\pi/3, \pi/6+/5,...l+\pi/2 k+1$, where $l$ is the directional axis of the entire transducer system formed by the preceding transducer systems.